(12) United States Patent
Green

(10) Patent No.: US 10,425,715 B2
(45) Date of Patent: Sep. 24, 2019

(54) HEADPHONE STAND

(71) Applicant: Andrew Bradford Green, Mt. Pleasant, SC (US)

(72) Inventor: Andrew Bradford Green, Mt. Pleasant, SC (US)

(*) Notice: Subject to any disclaimer, the term of this patent is extended or adjusted under 35 U.S.C. 154(b) by 0 days.

(21) Appl. No.: 15/444,081

(22) Filed: Feb. 27, 2017

(65) Prior Publication Data

US 2017/0251293 A1 Aug. 31, 2017

Related U.S. Application Data

(60) Provisional application No. 62/300,174, filed on Feb. 26, 2016.

(51) Int. Cl.
*H04R 1/10* (2006.01)
*H02J 7/00* (2006.01)

(52) U.S. Cl.
CPC .......... *H04R 1/1025* (2013.01); *H02J 7/0045* (2013.01); *H02J 7/0052* (2013.01); *H04R 1/1033* (2013.01); *H02J 2007/0062* (2013.01); *H04R 1/1008* (2013.01); *H04R 2420/09* (2013.01)

(58) Field of Classification Search
CPC .. H04R 1/1025; H04R 1/1008; H04R 1/1033; H04R 2420/09

USPC ......................................... 381/370–372, 384
See application file for complete search history.

(56) References Cited

U.S. PATENT DOCUMENTS

| | | | | |
|---|---|---|---|---|
| 5,187,744 A | * | 2/1993 | Richter | B60R 11/0241 224/553 |
| 8,811,646 B1 | * | 8/2014 | Romeo | H04R 1/1033 381/370 |
| 9,109,746 B1 | * | 8/2015 | Boyd | F16M 11/04 |
| 9,695,849 B2 | * | 7/2017 | Zhou | F16M 11/041 |

\* cited by examiner

*Primary Examiner* — Sunita Joshi
(74) *Attorney, Agent, or Firm* — Wayne Edward Ramage; Baker Donelson

(57) ABSTRACT

A headphone stand with a base, a stem extending vertically therefrom, and a holder affixed to the stem at or near the top. The holder may be lined, cushioned or padded. The stem is hollow in whole or in part. A recharging cable and plug (which may be a power plug, USB plug, or other form of plug) extends upwards from the base inside the stem, and emerge from an opening located in the stem. The portion of the cable corresponding to the opening is shaped so that the cable forms the cover for the opening when in the neutral position. The outside of the cable may be curved to match the curvature of the stem, and similarly colored, so that when in place as a cover for the opening, the plug on the cable is facing the interior of the stem and this section of the cable appears to be part of the stem.

14 Claims, 14 Drawing Sheets

HEADPHONE STAND

This application claims benefit of and priority to U.S. Provisional Application No. 62/300,174, filed Feb. 26, 2016, by Andrew Green, and is entitled to that filing date for priority. The specification, figures, and complete disclosure of U.S. Provisional Application No. 62/300,174 are incorporated herein in their entireties by specific reference for all purposes.

FIELD OF INVENTION

This invention relates to a stand for holding a headphone. More particularly, this invention relates to recharging stand for recharging while holding a headphone.

SUMMARY OF INVENTION

In various embodiments, the present invention comprises a headphone stand with a base, a stem extending vertically therefrom, and a holder affixed to the stem at or near the top. The holder may be lined, cushioned or padded. The holder may include an indentation or slot to help hold the headphones in place.

In one embodiment, the holder is integral with the stem, and is formed by a bending or curvature of the stem. The bottom of the base may be covered with a lining, rail, or rotary mechanism to protect the surface on which the stand is place, and allow the base to move or rotate.

In one embodiment, the stem is hollow in whole or in part. A recharging cable and plug (which may be a power plug, USB plug, or other form of plug) extends upwards from the base inside the stem, and emerge from an opening located in the stem. In several embodiments, the portion of the cable corresponding to the opening is shaped so that the cable forms the cover for the opening when in the neutral position. The outside of the cable may be curved to match the curvature of the stem, and similarly colored, so that when in place as a cover for the opening, the plug on the cable is facing the interior of the stem and this section of the cable appears to be part of the stem.

The cable is affixed to the stem at one end, and is made of flexible material, such as, but not limited to, rubber or plastic. One or more bumps, protrusions, or slots may be located along the outside of the cover portion of the cable, so that the user can easily pull the cable away from the stem, thereby exposing the plug. The plug may then be plugged into the appropriate port on the headphones for recharging. Upon removal of the plug, the cable twists back to the neutral position, and the cable is reinserted as the cover in the opening with minor pressure.

In several embodiments, the base of the stand contains a recharging unit compartment into which a recharging unit can be placed to provide power to the cable. The recharging unit may provide power from one or more batteries, which may be rechargeable. Alternatively, the recharging unit may connected by an electrical cord and plug to a standard power outlet. A portion of the electrical cord may be wrapped around appropriate brackets in the base, so that the recharging unit and cord are contained in the base and cannot be seen, except for the portion of the cord extending from the base (e.g., through a slot or opening in the back of the base).

DETAILED DESCRIPTION OF EXEMPLARY EMBODIMENTS

Figure 1:
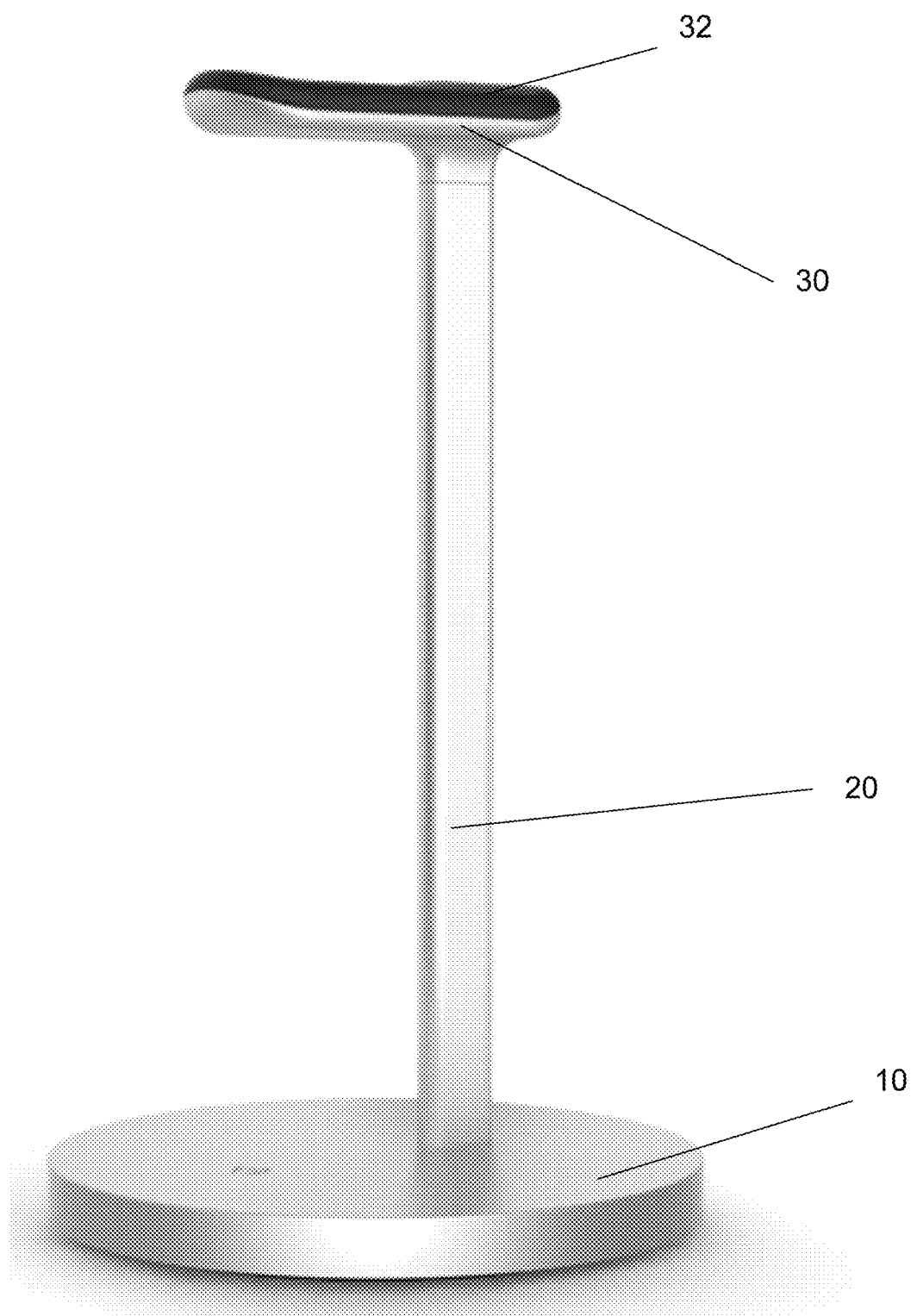
FIG. 1 shows a perspective view of a stand in accordance with an embodiment of the present invention.
Figure 2:
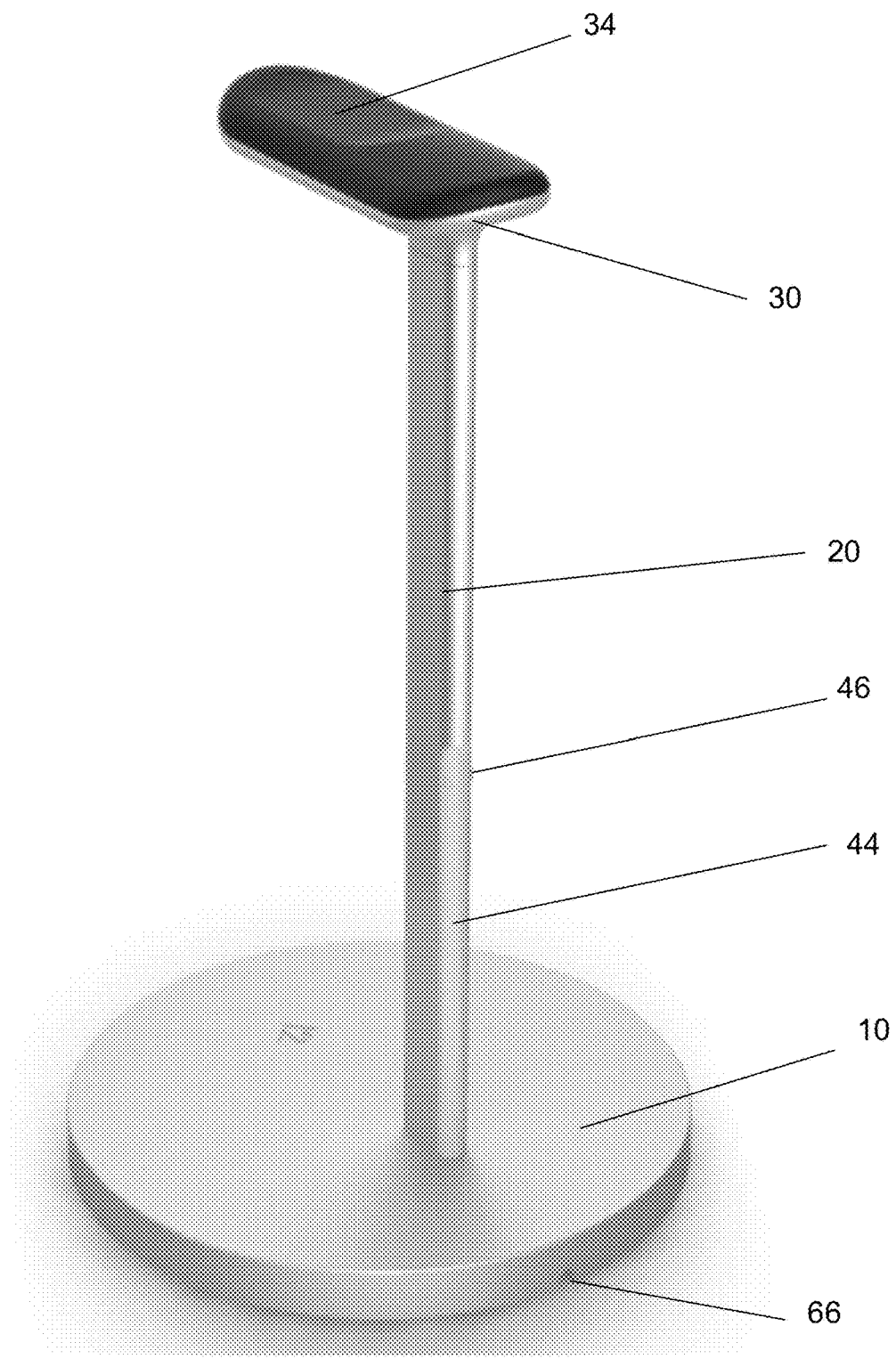
FIG. 2 shows another perspective view of the stand of FIG. 1.
Figure 3:
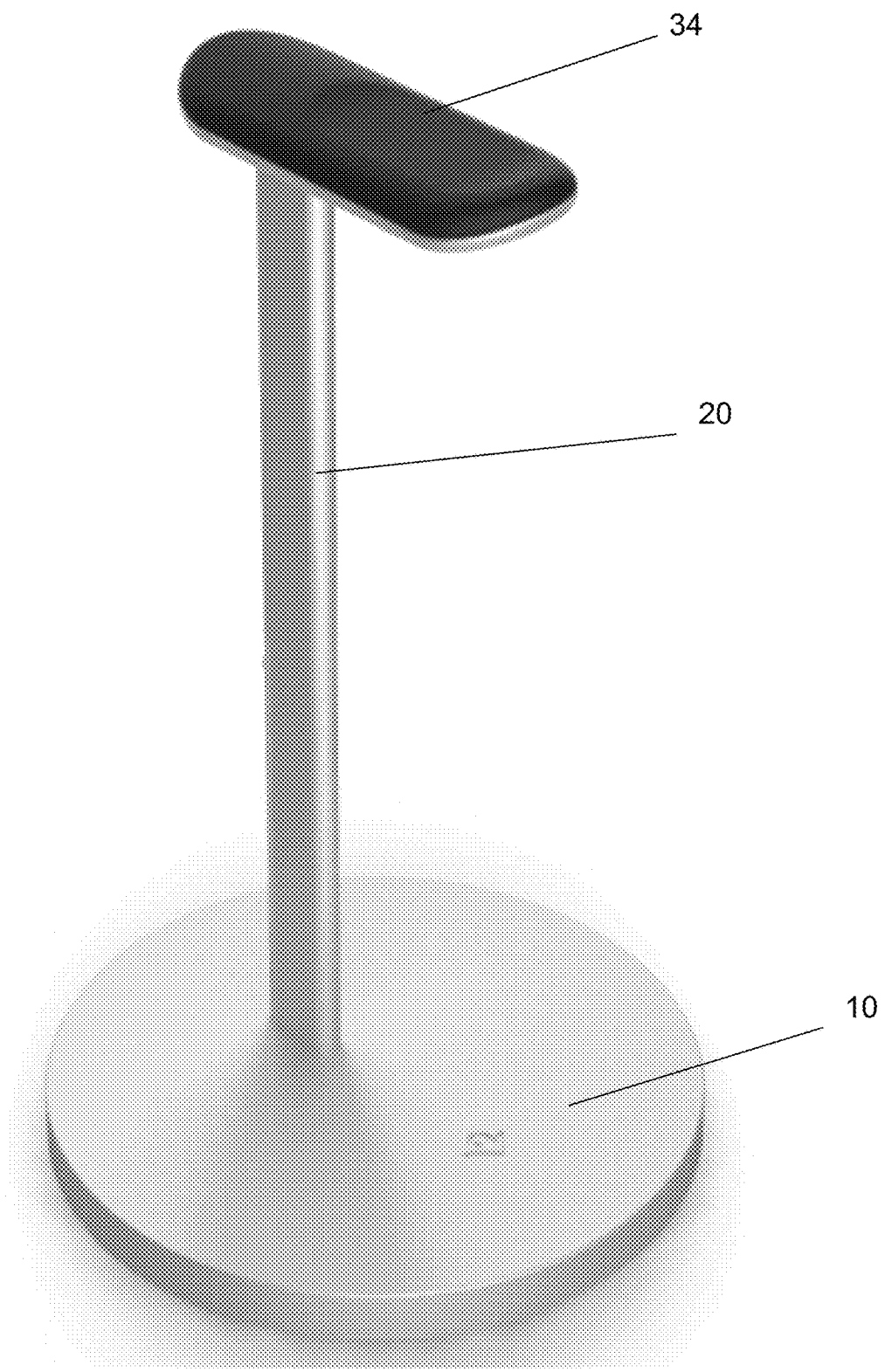
FIG. 3 shows another perspective view of the stand of FIG. 1.
Figure 4:
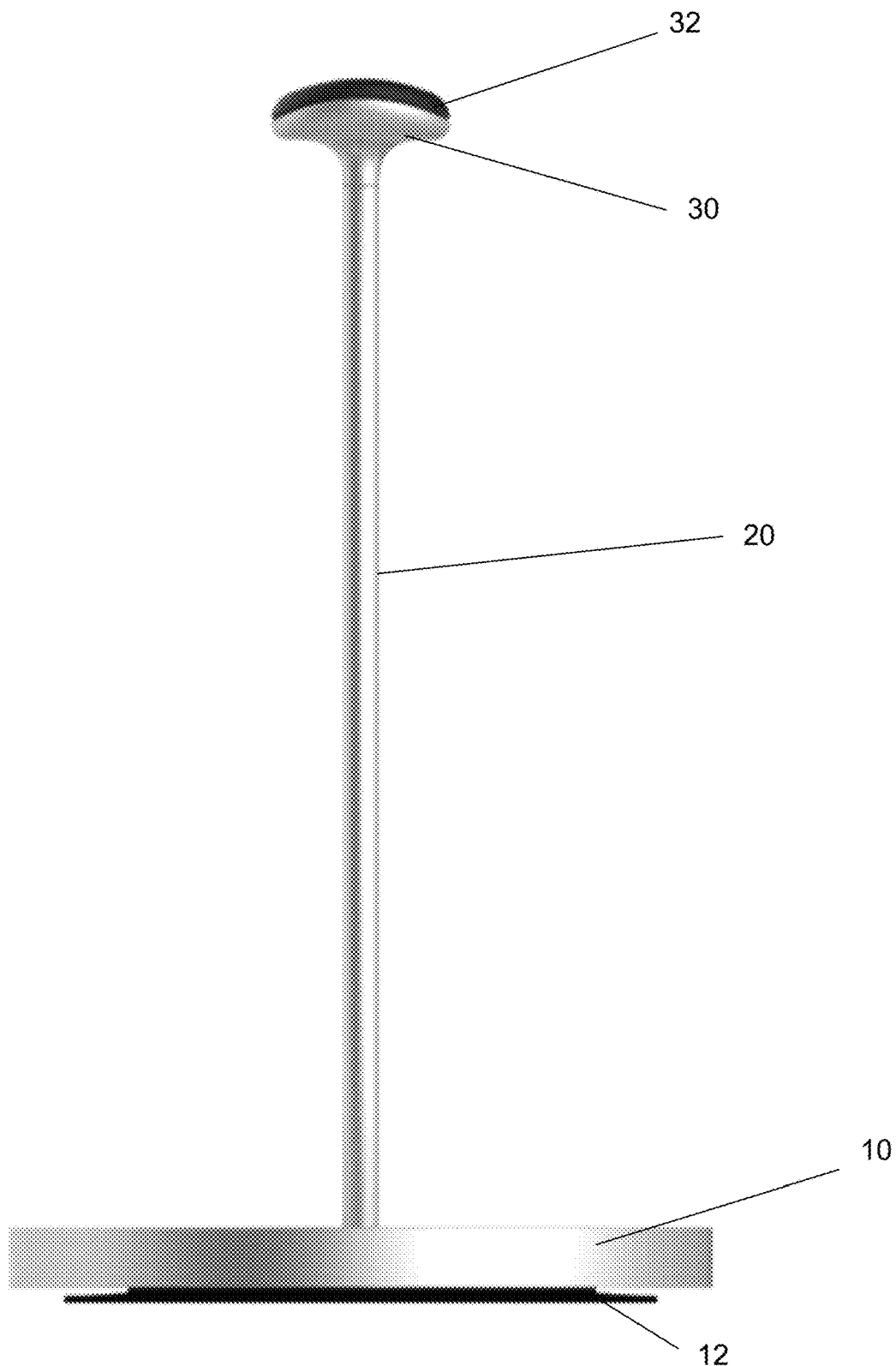
FIG. 4 shows a front view of the stand of FIG. 1.
Figure 5:
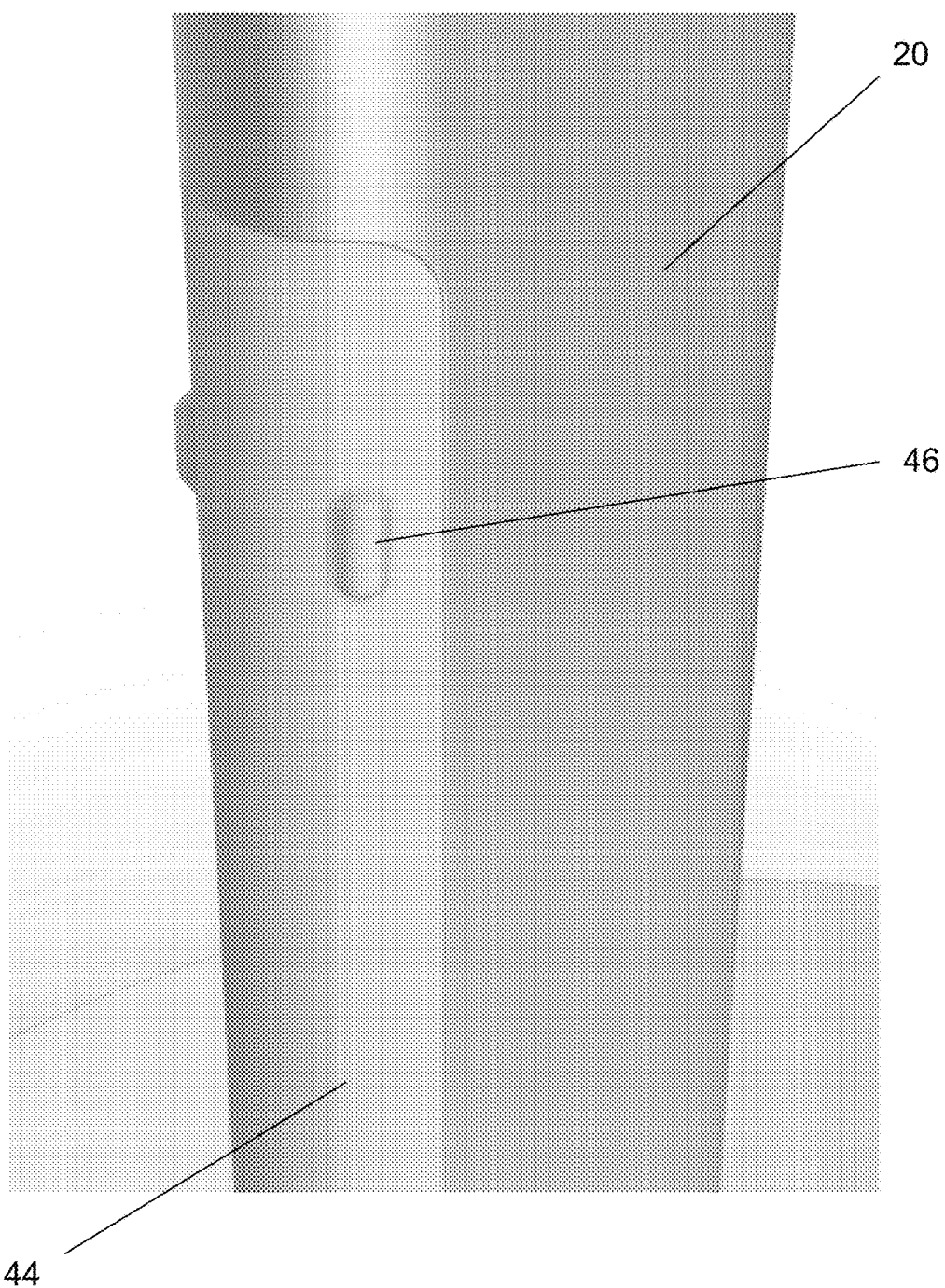
FIG. 5 shows a view of a recharging cable in place as a cover.
Figure 6:
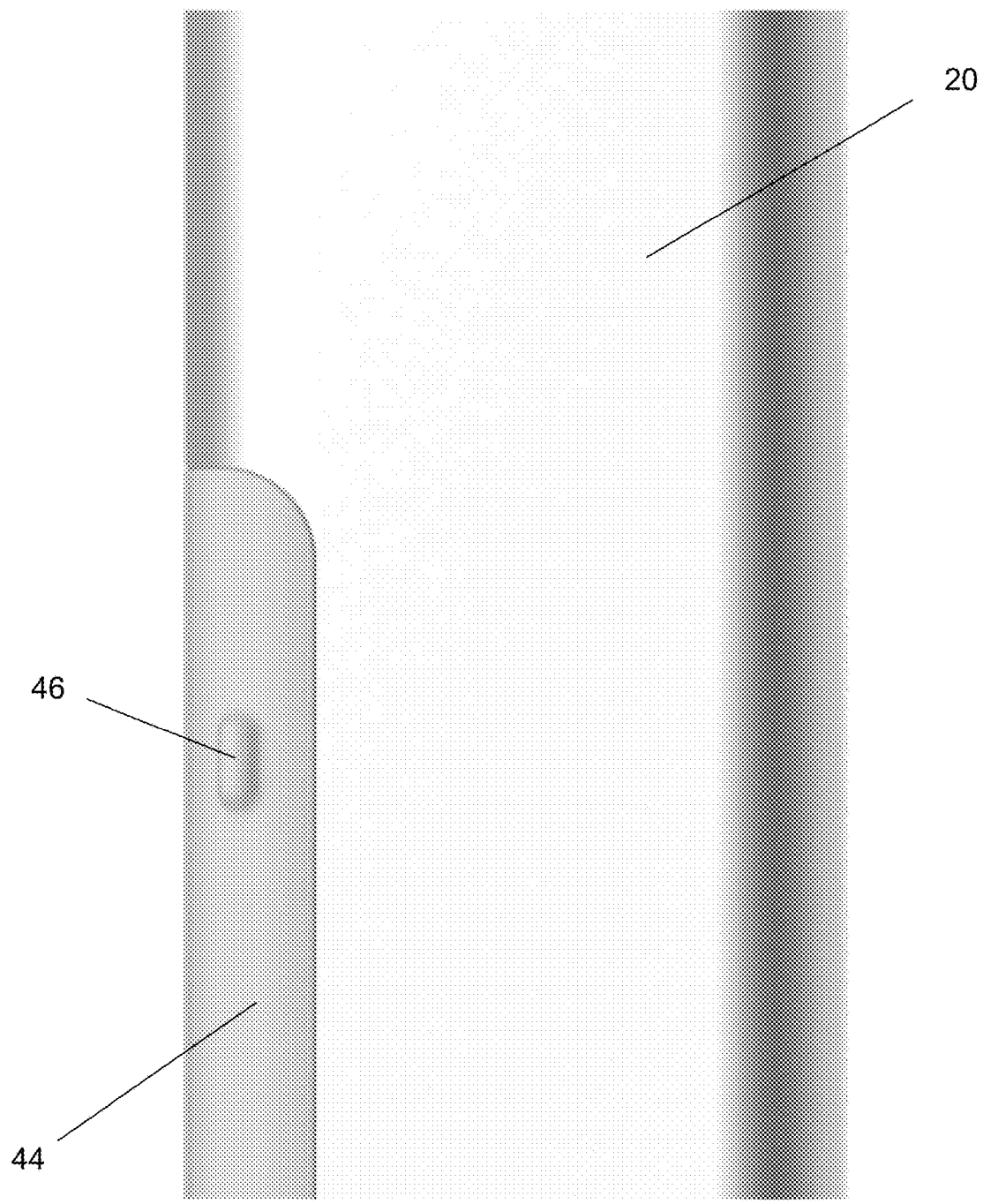
FIG. 6 shows a side view of a recharging cable in place as a cover.
Figure 7:
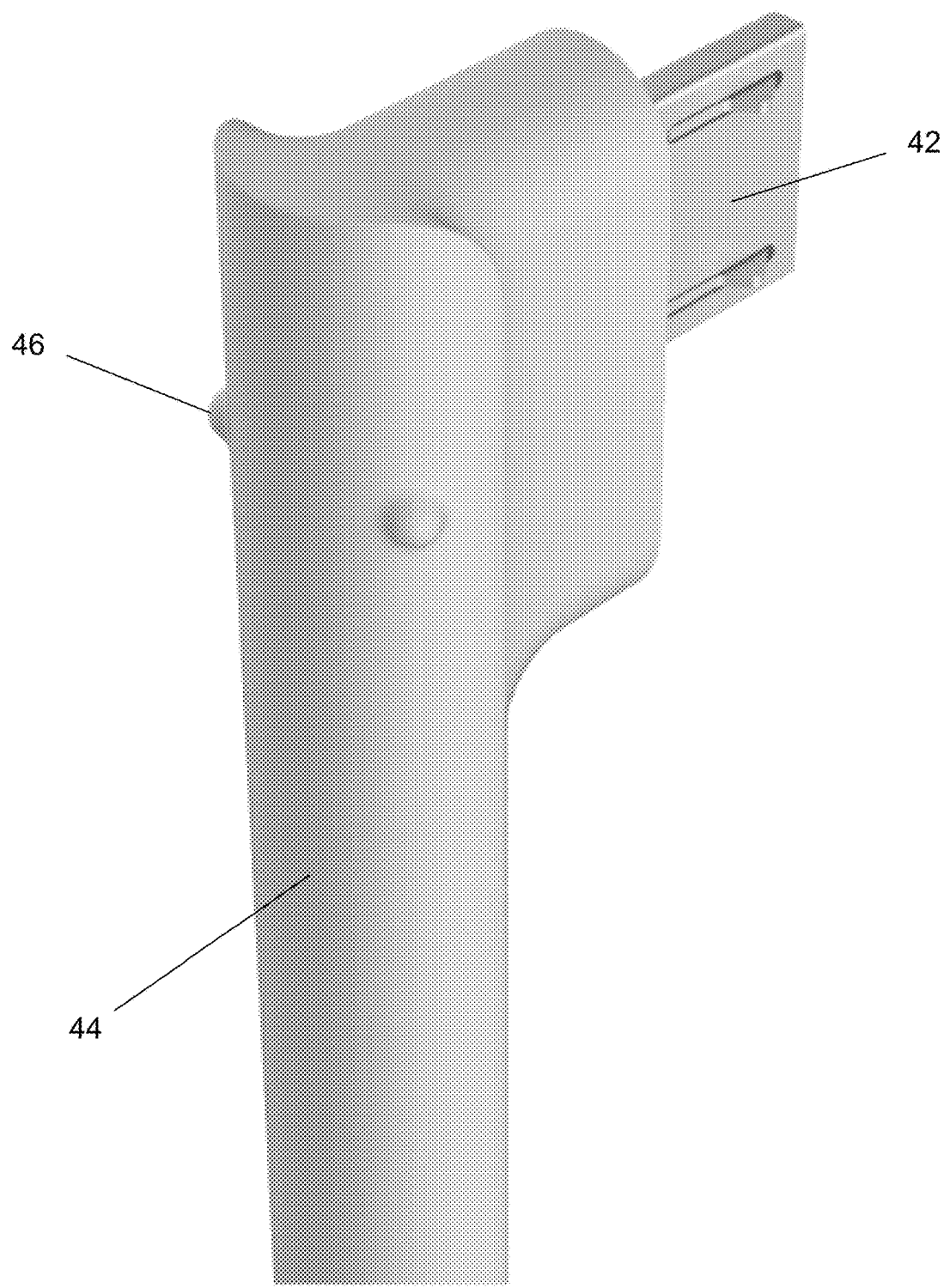
FIG. 7 shows a perspective view of recharging cable and plug.
Figure 8:
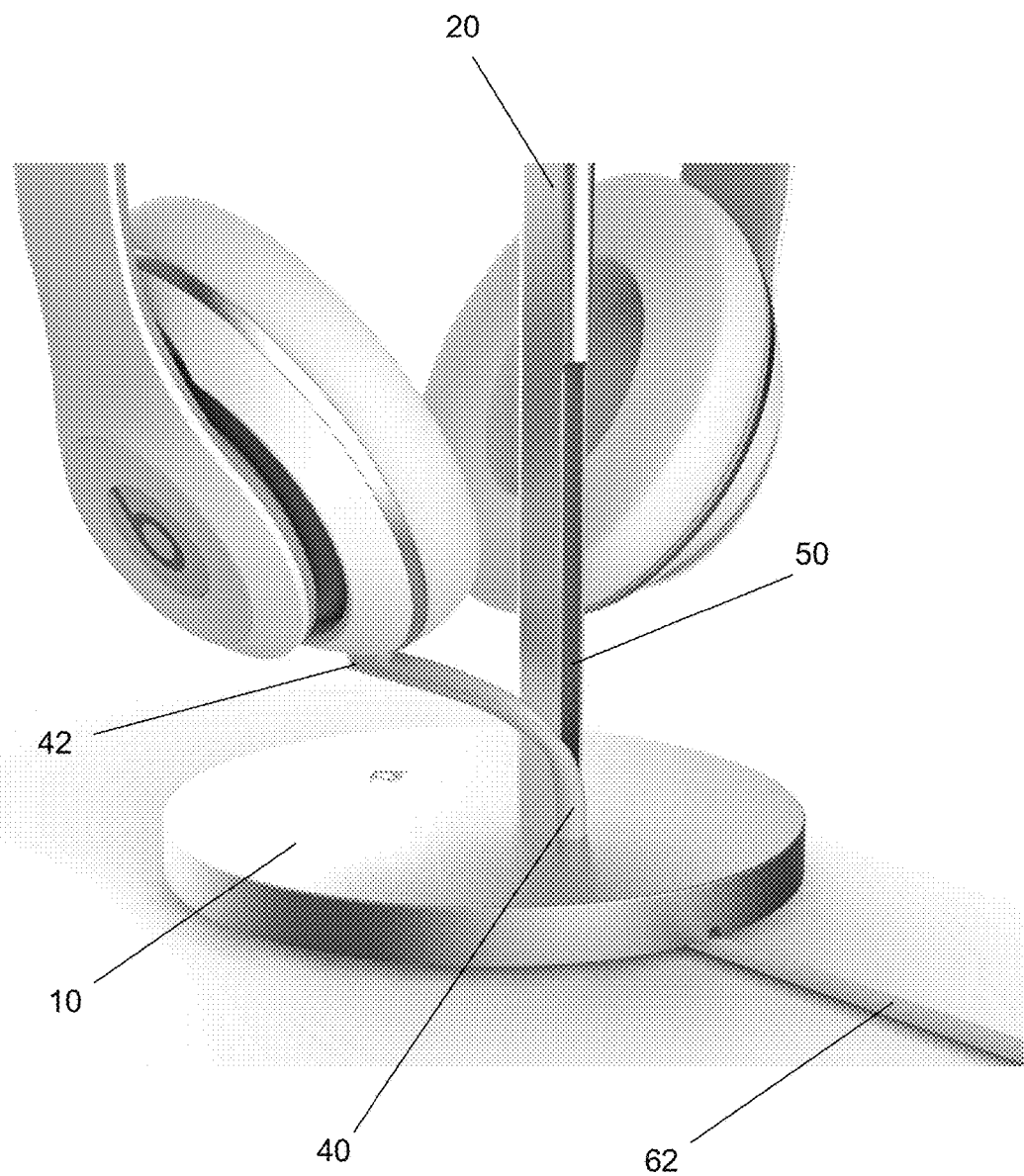
FIG. 8 shows a view of a recharging cable in use.
Figure 9:
FIG. 9 shows a front view of a recharging cable in use.
Figure 10:
FIG. 10 shows another view of a recharging cable in use.
Figure 11:
FIG. 11 shows a side view of a recharging cable in use.
Figure 12:
FIG. 12 shows a close-up view of FIG. 11.
Figure 13:
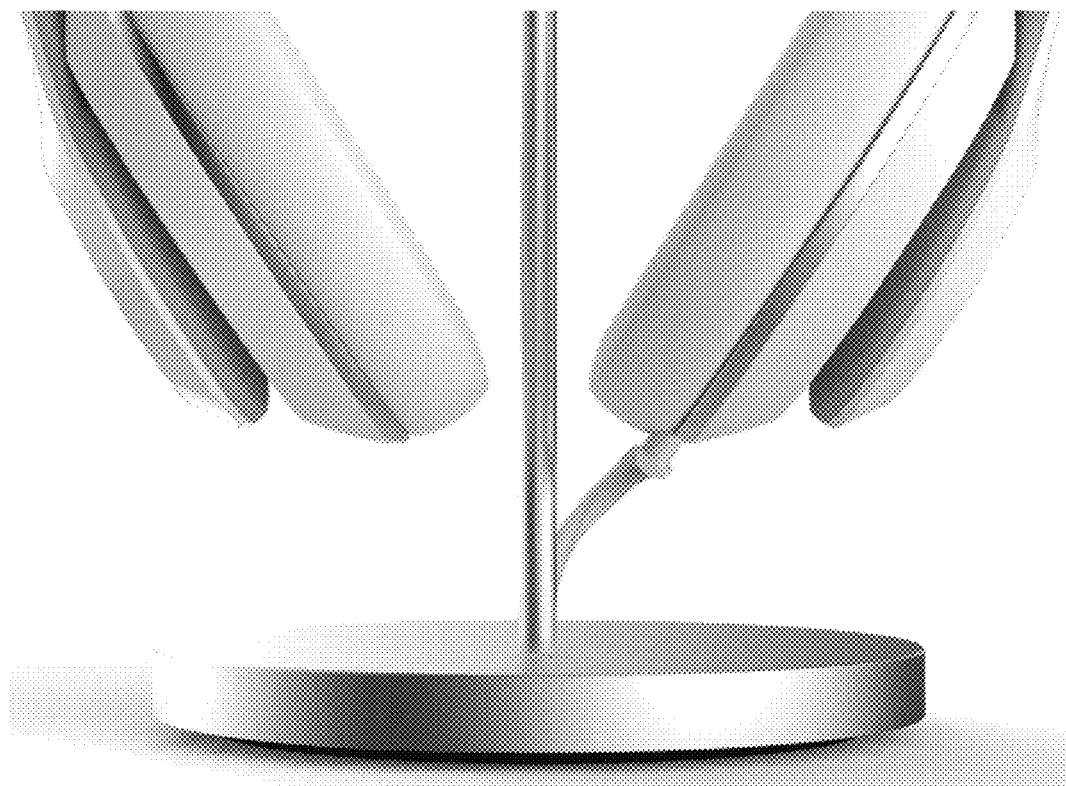
FIG. 13 shows a close-up view of a recharging cable in use.

In various exemplary embodiments, as seen in FIGS. 1-4, the present invention comprises a headphone stand with a base 10, a stem 20 extending vertically therefrom, and a holder 30 affixed to the stem at or near the top. The holder may be lined, cushioned or padded 32. The holder may include an indentation 34 or slot to help hold the headphones in place. In one embodiment, the holder is integral with the stem, and is formed by a bending or curvature of the stem. The bottom of the base 10 may be covered with a lining, rail, or rotary mechanism 12 to protect the surface on which the stand is place, and allow the base to move or rotate.

In one embodiment, the stem is hollow in whole or in part. A recharging cable 40 and plug 42 (which may be a power plug, USB plug, or other form of plug) extends upwards from the base inside the stem, and emerge from an opening 50 located in the stem. In FIGS. 1-4, the opening is located in the bottom portion of the back of the stem, but it may be located elsewhere in or on the stem.

As can be seen in FIGS. 5-13, the portion of the cable corresponding to the opening is shaped so that the cable forms the cover 44 for the opening when in the neutral position. The outside of the cable may be curved to match the curvature of the stem, and similarly colored, so that when in place as a cover for the opening, the plug on the cable is facing the interior of the stem and this section of the cable appears to be part of the stem.

The cable is affixed to the stem at one end, and is made of flexible material, such as, but not limited to, rubber or plastic. One or more bumps, protrusions, or slots 46 may be located along the outside of the cover portion 44 of the cable, so that the user can easily pull the cable away from the stem, thereby exposing the plug. The plug may then be plugged into the appropriate port on the headphones for recharging. Upon removal of the plug, the cable twists back to the neutral position, and the cable is reinserted as the cover in the opening with minor pressure.

Figure 14:
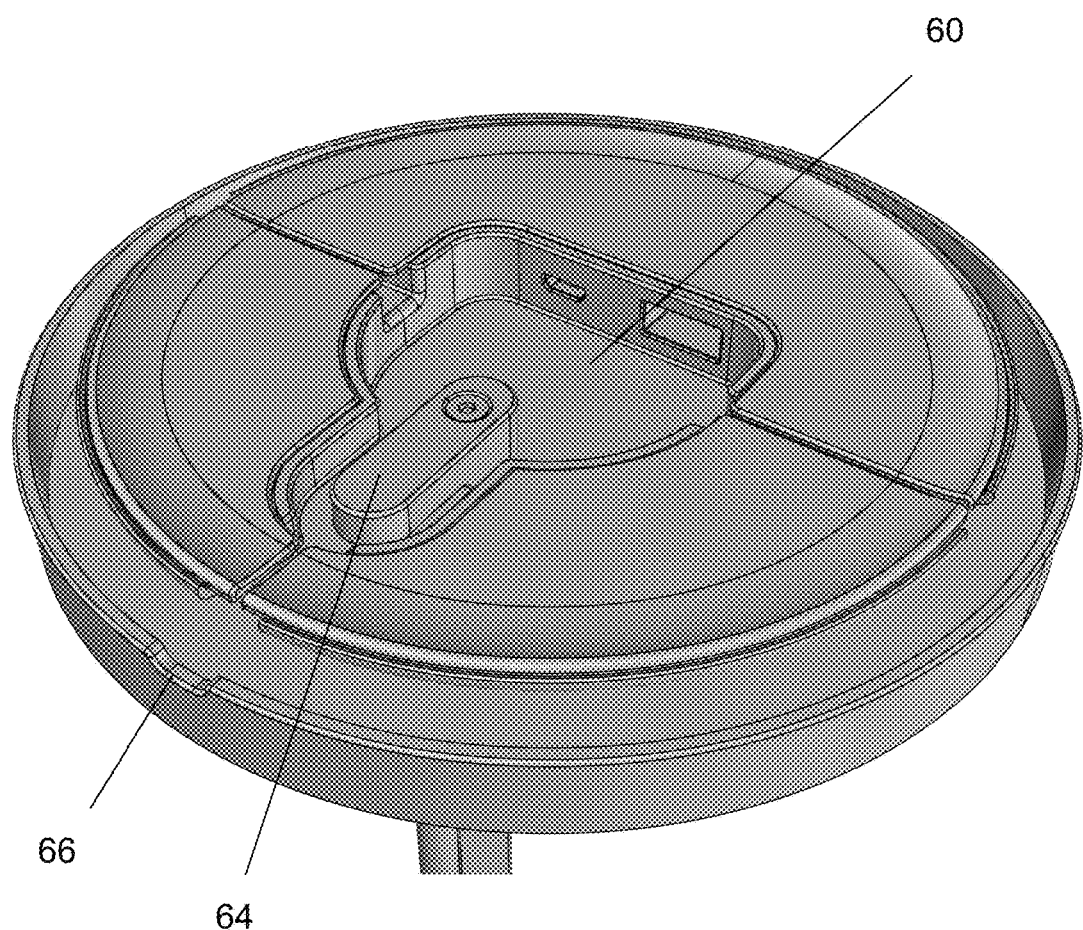
FIG. 14 shows a view of the bottom of the base with recharging unit compartment.

In several embodiments, as seen in FIG. 14, the base of the stand contains a recharging unit compartment 60 into which a recharging unit can be placed to provide power to the cable. The recharging unit may provide power from one or more batteries, which may be rechargeable. Alternatively, the recharging unit may connected by an electrical cord 62 and plug to a standard power outlet. A portion of the electrical cord may be wrapped around appropriate brackets 64 in the base, so that the recharging unit and cord are contained in the base and cannot be seen, except for the portion of the cord extending from the base (e.g., through a slot or opening 66 in the back of the base).

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A headphone stand, comprising:
   a base;
   a stem extending vertically from a lower end affixed to the base to a top end;
   a holder affixed on or proximal to the top end of the stem and extending horizontally therefrom; and
   a recharging cable and plug extending up the stem from the base for at least a portion of the lower end;
   wherein the holder is configured to support the headband of a headphone; and
   further wherein the holder comprises a top side and a bottom side, and the top is lined, cushioned or padded.

2. A headphone stand, comprising:
   a base;
   a stem extending vertically from a lower end affixed to the base to a top end;
   a holder affixed on or proximal to the top end of the stem and extending horizontally therefrom; and
   a recharging cable and plug extending up the stem from the base for at least a portion of the lower end;
   wherein the holder is configured to support the headband of a headphone; and
   further comprising an indentation in the holder configured to receive the headband.

3. The stand of claim 1, wherein the holder is formed by a bending in the top of the stem.

4. The stand of claim 1, wherein the base comprises a top and bottom, and an lining or covering on at least some of the bottom.

5. The stand of claim 1, wherein the plug comprises a power or USB plug.

6. The stand of claim 1, further comprising an opening in the base and stem.

7. The stand of claim 6, wherein the recharging cable and plug form a removable cover for the opening in the stem.

8. The stand of claim 7, wherein the plug faces the interior of the stem when the plug is in position as a cover for the opening.

9. A headphone stand, comprising:
   a base;
   a stem extending vertically from a lower end affixed to the base to a top end;
   a holder affixed on or proximal to the top end of the stem and extending horizontally therefrom; and
   a recharging cable and plug extending up the stem from the base for at least a portion of the lower end;
   wherein the holder is configured to support the headband of a headphone; and
   further wherein the plug can be removed from the stem, and is configured to plug into a recharging port on a set of headphones placed on the holder.

10. The stand of claim 1, further comprising one or more cavities in the base.

11. The stand of claim 10, further comprising a recharging unit adapted to be placed in one of said one or more cavities.

12. The stand of claim 10, wherein an end of the recharging cable opposite the plug extends into a recharging unit cavity in the base.

13. The stand of claim 1, further comprising one or more bumps or protrusions on the recharging cable.

14. The stand of claim 7, wherein the recharging cable comprises flexible material, and returns to a neutral position as a cover.

* * * * *